United States Patent [19]

Kanerva

[11] Patent Number: 5,468,007
[45] Date of Patent: Nov. 21, 1995

[54] TOWING HITCH

[75] Inventor: Ronald Kanerva, Lively, Canada

[73] Assignee: The Shop Industrial 510851 Ontario Ltd., Lively, Canada

[21] Appl. No.: 139,713

[22] Filed: Oct. 22, 1993

[30] Foreign Application Priority Data

Oct. 14, 1993 [CA] Canada ................... 2107992

[51] Int. Cl.$^6$ ..................... B06D 1/00
[52] U.S. Cl. .............. 280/499; 280/447; 280/469; 280/477; 280/492
[58] Field of Search ............. 280/477, 478.1, 280/492, 479.1, 479.2, 479.3, 499, 500, 501, 463, 466, 467, 468, 469, 447

[56] References Cited

U.S. PATENT DOCUMENTS

| | | | |
|---|---|---|---|
| 1,326,551 | 12/1919 | Turnbull | 280/447 |
| 1,636,845 | 7/1927 | Wieland | 280/447 |
| 2,133,202 | 10/1938 | Lanta | 280/492 |
| 2,253,420 | 8/1941 | Cupal | 280/469 |
| 2,414,248 | 1/1947 | Townsend | 280/447 |
| 2,582,595 | 1/1952 | LeVeke | 280/478 J |
| 2,946,603 | 7/1958 | Wald, Jr. et al. . | |
| 3,124,371 | 3/1960 | Weir . | |
| 3,360,067 | 12/1967 | Scott | 280/499 |
| 3,556,558 | 1/1971 | McKee | 280/492 |
| 4,196,917 | 4/1980 | Oakes et al. . | |
| 4,662,646 | 5/1987 | Schlapman et al. . | |
| 4,770,436 | 9/1988 | Anderson . | |
| 4,773,667 | 9/1988 | Elkins | 280/479.3 |

FOREIGN PATENT DOCUMENTS

| | | |
|---|---|---|
| 401229 | 12/1941 | Canada . |
| 611907 | 1/1961 | Canada . |
| 614540 | 2/1961 | Canada . |
| 704191 | 2/1965 | Canada . |
| 1077399 | 5/1980 | Canada . |
| 4200519 | 7/1993 | Germany ............. 280/479.3 |
| 1647519 | 9/1958 | Sweden ............ 280/499 |
| 178376 | 4/1922 | United Kingdom ......... 280/469 |
| 2219979 | 12/1989 | United Kingdom ......... 280/477 |

Primary Examiner—Mitchell J. Hill
Attorney, Agent, or Firm—J. D. Harris; R. A. Wilkes

[57] ABSTRACT

A towing hitch for attaching a towing vehicle to a towed object includes an arcuate guide attached around the back of the towing vehicle. A traveller, which moves freely along the guide, is hinged to a coupling which is, in turn, rotatably attached to the towed object. Steering the towing vehicle in either a clockwise or counter clockwise direction causes the traveller to move along the guide in the opposite direction, and the steering of the towing vehicle is facilitated. If the hitch includes a drive to power the traveller along the guide, the hitch alone can steer the towing vehicle.

24 Claims, 5 Drawing Sheets

TOWING HITCH

FIELD OF INVENTION

This invention relates to a towing hitch for attaching a towing vehicle to a towed object. More particularly, the invention, depending on the embodiment thereof, either facilitates or effects the steering of the towing vehicle.

BACKGROUND OF THE INVENTION

Towing vehicles are often required to tow objects which exert a strong resistance to towing. In the snowmobile industry, for example, tracked vehicles must pull massive trail groomers, heavily laden with snow, over winding, undulating trails of snow and ice. On ski slopes, tracked vehicles must tow snow groomers through snow and up steep slopes. Farm tractors must tow ploughs through earth and mud. Tanks and other military vehicles must tow heavy equipment over rough terrain.

In the above situations, and in many more, the towed objects exert significant resistance to towing. Where conventional towing hitches are used, such resistance adversely affects the towing vehicle's ability to change direction. That is to say, the force exerted by the towed object on the towing vehicle resists the towing vehicle's attempts to manoeuvre, with the result that the towing vehicle, if it can turn at all, is limited by a large minimum turning radius. Such a lack of manoeuvrability is generally undesirable and often unacceptable.

Another problem is that many tracked vehicles, as well as some wheeled vehicles, are steered by applying a brake to the track, tracks or wheels on one side of the vehicle. As a result, such vehicles often lose traction when attempting to turn while pulling heavy loads. In addition, such steering systems, often referred to as skid steering systems, are associated with significant wear on the vehicle's braking system.

It is known to enhance the turning ability of a towing vehicle by having a towed vehicle exert a turning moment on a towing vehicle which, in some circumstances, may be sufficient to steer the towing vehicle. In the snowmobile industry, for example, such a moment is known to be applied by attaching one or more hydraulic rams between a tractor and a trail groomer. In such an arrangement, the range of lateral movement of the trail groomer relative to the towing vehicle tends to be limited.

Another example of a towed object exerting a moment on a towing vehicle is found in Canadian Patent No. 401,229 (Davidson), which teaches a mechanism for steering a tractor with a single, centrally oriented track. The towed apparatus acts, in effect, as a rudder for the tractor.

SUMMARY OF THE INVENTION

The object of the invention is to provide an improved towing hitch for facilitating or effecting the turning of a towing vehicle while pulling a towed object.

According to the invention, there is provided a towing hitch for attaching a towing vehicle to a towed object comprising, in combination: an arcuate guide attachable in generally transverse orientation to a towing vehicle such that the guide faces convexly towards the rear of the towing vehicle; a traveller adapted to travel freely along the guide; a coupling having a first end attachable to the traveller and a second end attached to the object; a first pivot means providing an axis of rotation for the first end relative to the second end generally parallel to the plane of the guide; and a second pivot means providing an axis of rotation for the first end relative to the second end generally parallel to the axis of the coupling; the first pivot means being located substantially adjacent one end of the coupling, and the second pivot means being located substantially adjacent the other end of the coupling.

According to the invention there is also provided a towing hitch for attaching a towing vehicle to a towed object comprising, in combination: an arcuate guide attachable in generally transverse orientation to a towing vehicle such that the guide faces convexly towards the rear of the towing vehicle; a traveller adapted to travel along the guide; drive means adapted to drive the traveller along the guide; a coupling having a first end attachable to the traveller and a second end attached to the object; a first pivot means providing an axis of rotation for the first end relative to the second end generally parallel to the plane of the guide; and a second pivot means providing an axis of rotation for the first end relative to the second end generally parallel to the axis of the coupling; the first pivot means being located substantially adjacent one end of the coupling, and the second pivot means being located substantially adjacent the other end of the coupling.

In an embodiment of the invention not including a drive, or in an embodiment including a drive but where the drive has ceased to function, steering the towing vehicle in either a clockwise or counter clockwise direction causes the traveller to travel along the guide in the opposite direction. As the resistance to turning exerted by the towed object on the towing vehicle is thus reduced, the steering of the towing vehicle is facilitated. Such a towing hitch compliments the towing vehicle's existing steering system so as to improve manoeuvrability and reduce the minimum turning radius. If the towing vehicle's steering system is a skid steer system, less braking is required, which results in increased traction and less wear on the towing vehicle's brakes.

In an embodiment including a drive, the towing vehicle's steering system may become unnecessary during towing, as the towing hitch is capable of steering the towing vehicle. Such a towing hitch is an effective steering system capable of achieving a small turning radius without either adversely affecting the towing vehicle's traction or utilizing the towing vehicle's steering system.

BRIEF DESCRIPTION OF THE DRAWINGS

The embodiments of the invention will now be described with reference to the accompanying drawings, in which.

Similar references are used in FIGS. 1 to 6 to denote similar components.

DETAILED DESCRIPTION OF THE INVENTION

Figure 1:
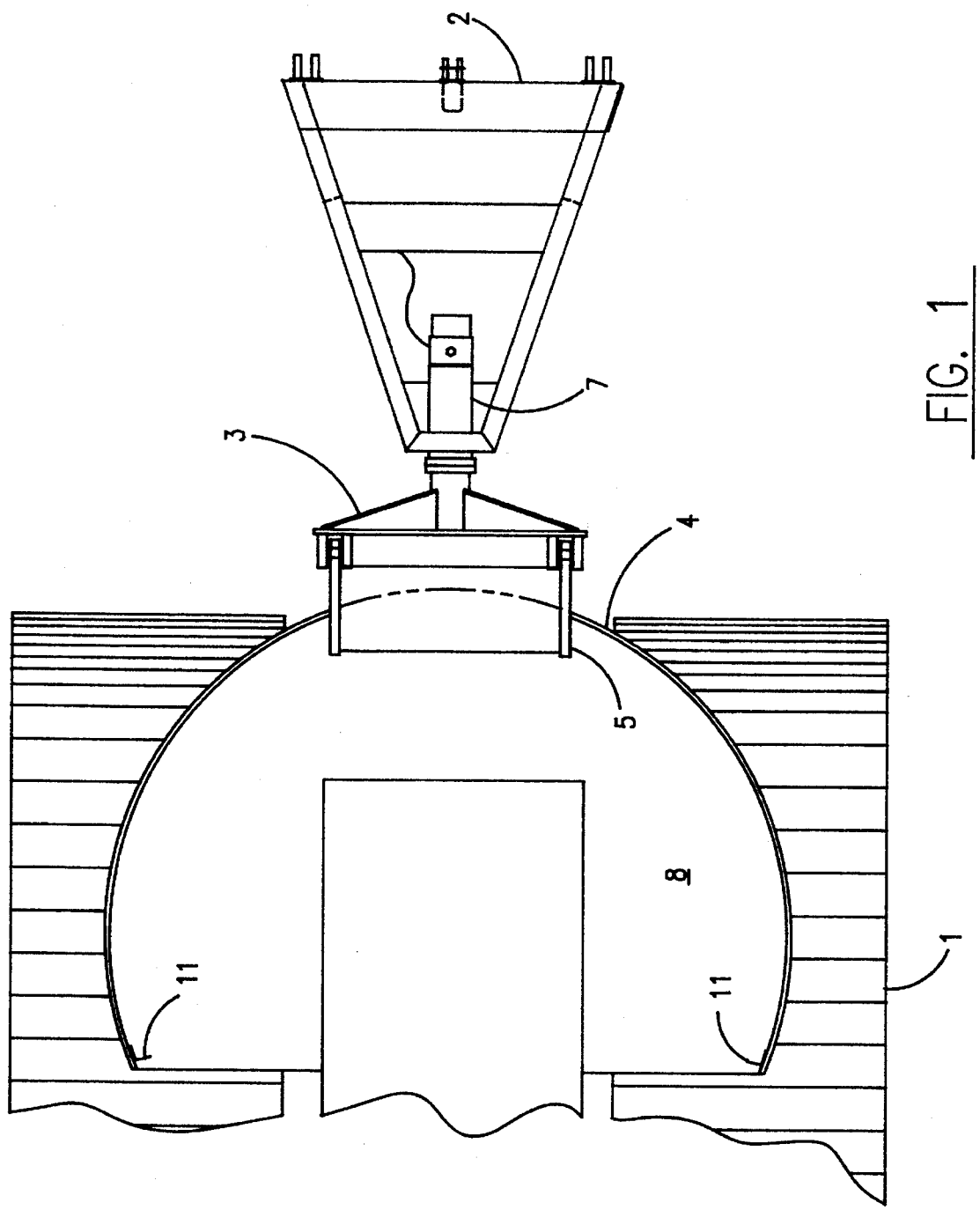
FIG. 1 shows the general arrangement of the hitch.

Referring to FIG. 1, a towing vehicle 1 is attached to a towed object 2 with a towing hitch 3.

The towing hitch 3 includes a guide 4 along which a traveller 5 travels between end stops 11 which are attached to the guide 4. A coupling 7 connects the traveller 5 with the towed object 2. The guide 4 includes a tray 8 which is attached to the towing vehicle 1.

Figure 3:
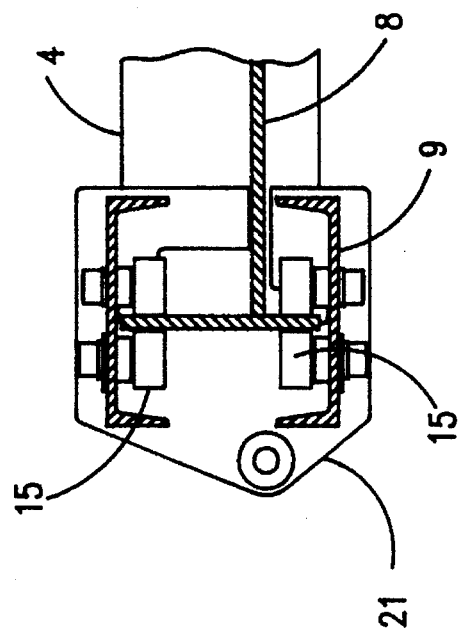
FIG. 3 is a section on line I—I in FIG. 2.
Figure 2:
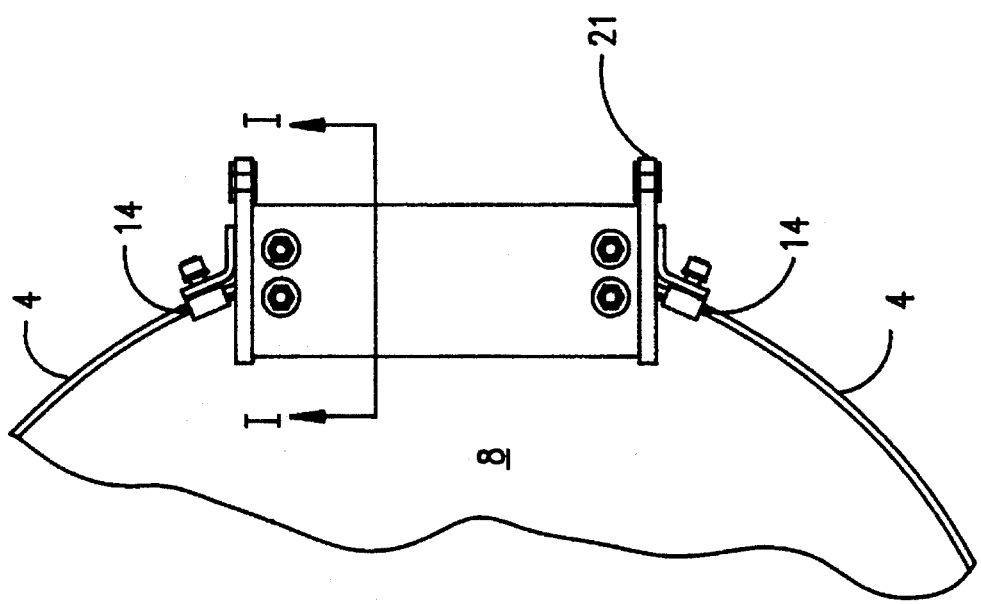
FIG. 2 shows a rolling traveller.

The simple unpowered traveller 5 shown in FIGS. 2 and 3 includes horizontal rollers 14 and vertical rollers 15 suitably attached to the frame 9 of the traveller 5 to facilitate movement of the traveller 5 along the guide 4.

Figure 5:
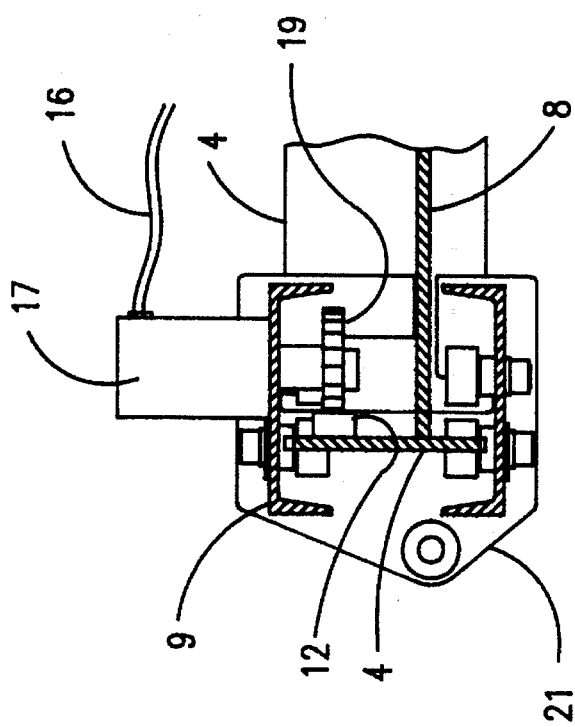
FIG. 5 is a section on line II—II in FIG. 4.
Figure 4:
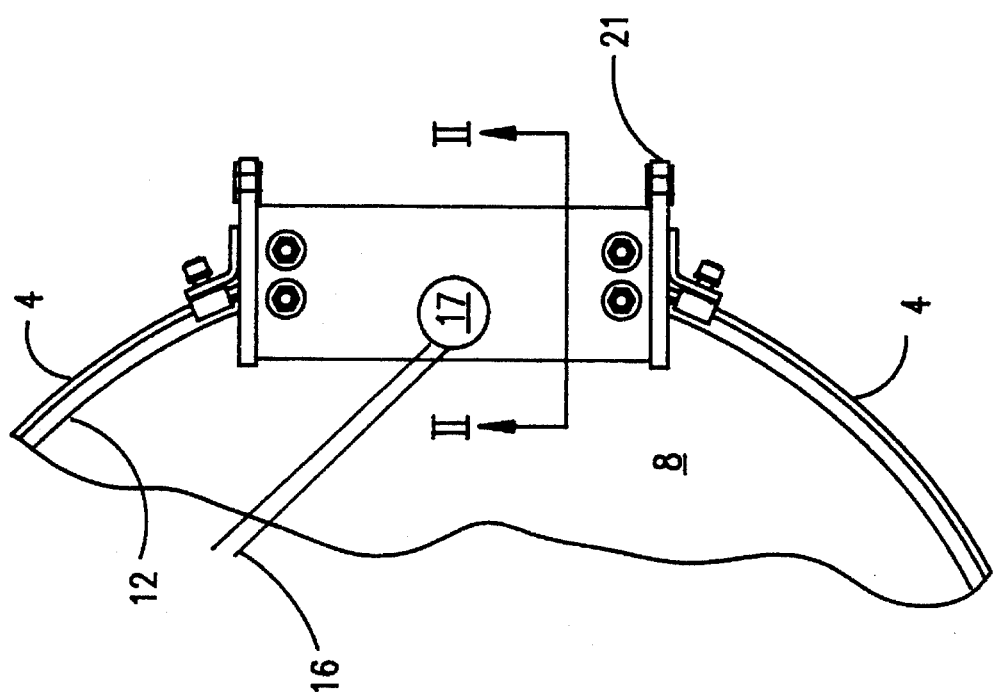
FIG. 4 shows a hydraulically powered traveller.

The powered traveller 5 shown in FIGS. 4 and 5 also includes the rollers 14 and 15. Welded to the inside of the guide 4 is a roller chain 12 which follows the inside surface of the guide 4 above the tray 8.

The drive 6 is driven by a control system (see FIG. 7), which controls the flow of hydraulic fluid passing through the hydraulic hoses 16. Attached to the hydraulic hoses 16, and driven by the hydraulic fluid, is a hydraulic motor 17 which is suitably attached to the traveller frame 9. The hydraulic motor 17 drives a sprocket 19 which engages into the chain 12, thereby driving the traveller 5 along the guide 4.

Figure 6:
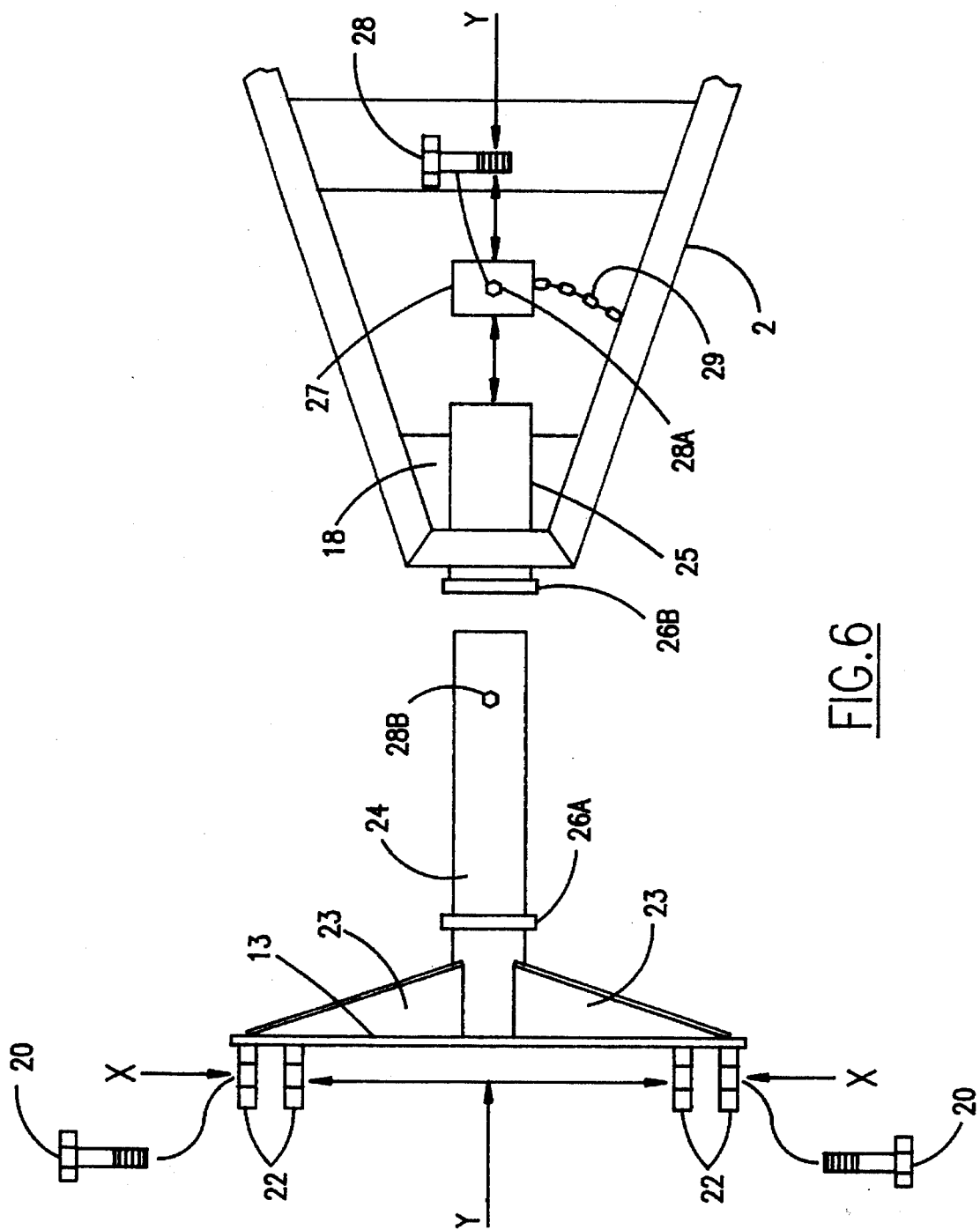
FIG. 6 shows the parts of the coupling separated.

Referring to FIG. 6, the coupling 7 includes a first pivot means 7A comprising two pins 20, each of which passes through flanges 21 (see FIG. 3) on the traveller 5 and double flanges 22 on the coupling 7. The coupling 7 is thereby pivotable about the axis shown at X relative to the traveller 5.

The coupling 7 also includes a second pivot means 7B comprising a face plate 13, to which the triangular members 23, the double flanges 22, and an inner pipe 24 are welded. The inner pipe 24 passes through and is rotatable within an outer pipe 25 which is welded to the towed object 2. If desired, strengthening plates as at 18 can be inserted. Axial movement of the inner pipe 24 relative to the outer pipe 25 is restricted by the annular flanges 26A and 26B, and by a collar 27 held in place by shear pin 28, which passes through holes 28A and 28B. If desired, a chain 29 secures the collar 27 to the towed object 2.

Figure 7:
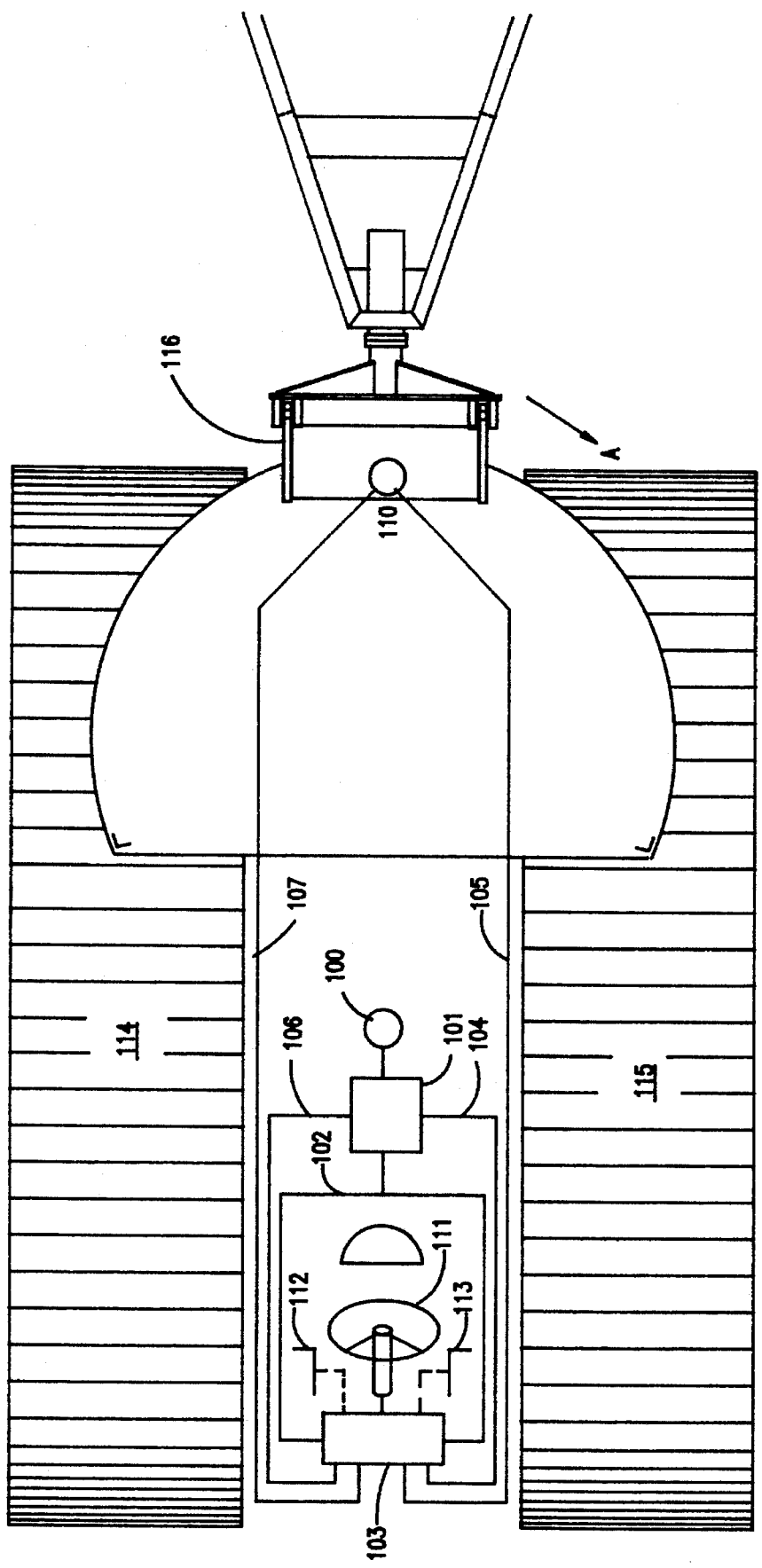
FIG. 7 shows a schematic for a typical hydraulic system.

The drive system for the powered traveller of FIGS. 3 and 4 is shown schematically in FIG. 7. A pump 100, powered from the vehicle engine (not shown) supplies hydraulic fluid under pressure to a reservoir 101. Pressurized fluid is fed to a valve 103 by a pipe 102. To turn one way, pressurized fluid is fed from the valve 103 to the hydraulic motor 110 by pipes 105, and vented from the motor 110 through lines 107 and 106 back to the reservoir 101. To turn the other way, the fluid flows through a pipe 107 to the motor 110, which vents through lines 105 and 104. The valve 103 is internally constructed to provide the required paths. To steer the vehicle there are two options, depending on whether or not the steering wheel 111 is fitted in addition to the conventional brake pedals 112 and 113 for the tracks 114 and 115. If the wheel 111 is fitted, then moving it as appropriate, for example to turn left, causes the traveller to move in the direction of arrow A. Returning the wheel to straight ahead brings the traveller 5 back to its central position. The pedals 113 and 112 need not be used. If the wheel 111 is not fitted, operation of the brake 113, to slow the track 115, again to turn left, similarly moves the traveller in the direction A. Release of the pedal 113 moves the traveller back to the central position.

With the drive 100 deactivated, a powered traveller 5 is able to move freely along the guide 4, and the towing hitch 3 is used to compliment a towing vehicle's 1 existing steering system. When the towing vehicle is steered counter clockwise, for example, the traveller 5 moves clockwise, thereby reducing the moment applied by the towed object 2 to the towing vehicle 1 opposite the desired direction of the turning, such moment being caused by the resistance of the towed object 2 to being towed.

As the towing vehicle 1 and towed object 2 pass over uneven ground, the coupling 7 allows rotation of the towed object 2 relative to the towing vehicle 1 around the shared axis Y (FIG. 6) of the inner pipe 24 and the outer pipe 25. As the towing vehicle 1 and the towed object 2 pass over uneven ground or ascend or descend slopes, the coupling 7 allows the towed object 2 to pivot about the axis X (FIG. 6) and move in a plane generally perpendicular to the ground surface. Pivoting of the towed object relative to the towing vehicle 1 in a turning plane generally parallel to the ground surface is resisted by the coupling 7. When the drive is activated, the towed object 2 and towing vehicle 1 exert turning moments on each other in the turning plane to cause the traveller 5 to move along the guide 4 in the direction of turning, that is to say, to the left or right.

Many modifications of the above described embodiments would be apparent to those skilled in the art. The towing vehicle, for example, could be, among other things, a tracked or wheeled vehicle with or without skid steer, a tracked or wheeled tractor, a tank, a flatbed truck, a pick-up truck, or an automobile. The towed object could be, among other things, a snowmobile trail groomer, a ski slope groomer, a grader, a piece of field artillery, a wheeled trailer, a plough, a crate, a felled tree, or a rock. The motor could be, among other things, an electric motor or an internal combustion engine; alternatively, a manually operated drive could replace the motor in some applications. The gear, instead of comprising a sprocket and roller chain, could, among other things, comprise a rack (e.g., mounted on the guide) and pinion (e.g., mounted on the traveller), or a worm and roller. The arc of the guide could, among other things, be parabolic or elliptical.

Numerous modifications, variations, and adaptations may be made to the particular embodiment of the invention described above without departing from the scope of the invention, which is defined in the claims.

The embodiments of the invention in which an exclusive property or privilege is claimed are defined as follows:

1. A towing hitch for attaching a towing vehicle to a towed object comprising, in combination:

an arcuate guide defining a plane and attachable in generally transverse orientation to a towing vehicle such that the guide faces convexly towards the rear of the towing vehicle, the guide comprising a tray attachable in generally transverse orientation to a towing vehicle, and an arcuate plate rigidly mounted generally perpendicularly on the tray;

a traveller adapted to travel freely along the guide;

a rigid coupling having two ends, a first end attached to the traveller and a second end attachable to the object;

a first pivot means providing an axis of rotation for the first end relative to the second end generally parallel to the plane of the guide and generally perpendicular to the axis of the coupling; and a second pivot means providing an axis of rotation for the first end relative to the second end generally parallel to the axis of the coupling;

the first pivot means being located substantially adjacent one of the two ends of the coupling, and the second pivot means being located substantially adjacent the other of the two ends of the coupling.

2. A towing hitch as defined in claim 1, wherein the arc formed by the guide is generally in the shape of a portion of a circle.

3. A towing hitch as defined in claim 2 wherein the portion of the circle is greater than a semi-circle and less than a full circle.

4. A towing hitch as defined in claim 1, wherein the guide is generally circular.

5. A towing hitch as defined in claim 1, wherein the guide includes two stops adapted to limit the range of motion of the traveller along the guide.

6. A towing hitch as defined in claim 1, wherein the tray comprises an edge and wherein the arcuate plate is rigidly mounted generally perpendicularly on the edge of the tray.

7. A towing hitch as defined in claim 6, wherein the traveller includes a plurality of rollers adapted to direct the traveller along the plate.

8. A towing hitch as defined in claim 1, wherein the first pivot means is located substantially adjacent the first end of the coupling.

9. A towing hitch as defined in claim 8, wherein the first pivot means comprises two spaced apart coaxial transverse pins which pass through both the traveller and the coupling so as to allow the coupling to pivot about the traveller.

10. A towing hitch as defined in claim 8, wherein the second pivot means comprises a cylinder rigidly attachable to the object, the axis of the cylinder passing through the first end of the coupling, and a shaft coaxial with and rotatable within the cylinder.

11. A towing hitch for attaching a towing vehicle to a towed object comprising, in combination:

an arcuate guide defining a plane and attachable in generally transverse orientation to a towing vehicle such that the guide faces convexly towards the rear of the towing vehicle;

a traveller adapted to travel along the guide;

drive means adapted to drive the traveller along the guide;

a rigid coupling having two ends, a first end attached to the traveller and a second end attachable to the object;

a first pivot means providing an axis of rotation for the first end relative to the second end generally parallel to the plane of the guide and generally perpendicular to the axis of the coupling; and a second pivot means providing an axis of rotation for the first end relative to the second end generally parallel to the axis of the coupling;

the first pivot means being located substantially adjacent one of the two ends of the coupling, and the second pivot means being located substantially adjacent the other of the two ends of the coupling.

12. A towing hitch as defined in claim 11, wherein the drive means includes a gear which moves the traveller along the guide.

13. A towing hitch as defined in claim 12, wherein the gear is driven by a motor mounted on the traveller.

14. A towing hitch as defined in claim 13, wherein the motor is a hydraulic motor.

15. A towing hitch as defined in claim 13, wherein the gear includes a transversely oriented sprocket which engages a roller chain mounted on the guide.

16. A towing hitch as defined in claim 11, wherein the arc formed by the guide is generally in the shape of a portion of a circle.

17. A towing hitch as defined in claim 16, wherein the portion of the circle is greater than a semi-circle and less than a full circle.

18. A towing hitch as defined in claim 11, wherein the guide is generally circular.

19. A towing hitch as defined in claim 11, wherein the guide includes two stops adapted to limit the range of motion of the traveller along the guide.

20. A towing hitch as defined in claim 11, wherein the guide comprises a tray attachable in generally transverse orientation to a towing vehicle, and an arcuate plate rigidly mounted generally perpendicularly on an edge of the tray.

21. A towing hitch as defined in claim 20, wherein the traveller includes a plurality of rollers adapted to direct the traveller along the plate.

22. A towing hitch as defined in claim 11, wherein the first pivot means is located substantially adjacent the first end of the coupling.

23. A towing hitch as defined in claim 22, wherein the first pivot means comprises two spaced apart coaxial transverse pins which pass through both the traveller and the coupling so as to allow the coupling to pivot about the traveller.

24. A towing hitch as defined in claim 22, wherein the second pivot means comprises a cylinder rigidly attachable to the object, the axis of the cylinder passing through the first end of the coupling, and a shaft coaxial with and rotatable within the cylinder.

* * * * *